US009813536B2

(12) United States Patent
Abramo

(10) Patent No.: US 9,813,536 B2
(45) Date of Patent: Nov. 7, 2017

(54) SYSTEM FOR TESTING WIRELESS INTERACTION BETWEEN A SYSTEM FOR REPRODUCING AUDIO SIGNALS AND A MOBILE PHONE, AND CORRESPONDING METHOD AND COMPUTER PROGRAM PRODUCT

(71) Applicant: Magneti Marelli S.p.A., Corbetta (IT)

(72) Inventor: Felice Abramo, Corbetta (IT)

(73) Assignee: Magneti Marelli S.p.A., Corbetta (IT)

( * ) Notice: Subject to any disclaimer, the term of this patent is extended or adjusted under 35 U.S.C. 154(b) by 0 days.

(21) Appl. No.: 14/555,320

(22) Filed: Nov. 26, 2014

(65) Prior Publication Data

US 2015/0156299 A1 Jun. 4, 2015

(30) Foreign Application Priority Data

Nov. 29, 2013 (IT) .............................. TO2013A0974

(51) Int. Cl.

| | |
|---|---|
| ***H04M 1/60*** | (2006.01) |
| ***H04M 1/24*** | (2006.01) |
| ***H04L 29/08*** | (2006.01) |
| ***H04W 4/00*** | (2009.01) |
| ***H04W 76/02*** | (2009.01) |

(52) U.S. Cl.

CPC .......... *H04M 1/6091* (2013.01); *H04L 67/12* (2013.01); *H04M 1/24* (2013.01); *H04W 4/008* (2013.01); *H04W 76/023* (2013.01); *H04M 2250/02* (2013.01)

(58) Field of Classification Search

CPC .. H04M 2250/02; H04M 1/24; G06F 11/2733

See application file for complete search history.

(56) References Cited

U.S. PATENT DOCUMENTS

| | | | | |
|---|---|---|---|---|
| 8,983,845 | B1 * | 3/2015 | Kristjansson | G10L 21/00 381/58 |
| 2002/0004763 | A1 * | 1/2002 | Lam | G06F 1/26 705/26.44 |
| 2003/0074209 | A1 * | 4/2003 | Tobin | G06Q 20/206 705/18 |

(Continued)

OTHER PUBLICATIONS

Apr. 30, 2014 European Search Report for Italian Patent Application No. IT TO20130974.

*Primary Examiner* — Cindy Trandai

(74) *Attorney, Agent, or Firm* — Howard & Howard Attorneys PLLC

(57) ABSTRACT

Described herein is a system for testing wireless interaction of a system for reproduction of audio signals, in particular a user-interface device of a motor vehicle configured for reproducing audio signals, with a mobile phone, said reproduction system and said mobile phone being configured for communicating over a wireless communication channel for short-range communications.

According to the invention, the above system comprises a module for simulation of a mobile phone, comprising processing means configured for simulating operation of a mobile phone, said module for simulation of a mobile phone being associated in a signal-exchange relationship to a short-range wireless transceiver module configured for communicating via said wireless communication channel with the system for reproduction of audio signals.

14 Claims, 7 Drawing Sheets

(56) References Cited

U.S. PATENT DOCUMENTS

| | | | | |
|---|---|---|---|---|
| 2004/0185915 | A1* | 9/2004 | Ihara | H04M 1/6066 455/569.1 |
| 2004/0209569 | A1* | 10/2004 | Heinonen | H04M 1/6066 455/41.2 |
| 2006/0221856 | A1* | 10/2006 | Quiroz | H04W 84/20 370/254 |
| 2006/0240817 | A1* | 10/2006 | Akiyama | H04W 88/04 455/426.2 |
| 2007/0015485 | A1* | 1/2007 | DeBiasio | H04B 1/082 455/345 |
| 2007/0155324 | A1* | 7/2007 | Lee | H04M 1/7253 455/41.2 |
| 2008/0085745 | A1 | 4/2008 | Ozaki | |
| 2009/0319663 | A1* | 12/2009 | Giles | H04W 8/183 709/226 |
| 2010/0130195 | A1* | 5/2010 | Rohaly | H04W 24/06 455/425 |
| 2011/0064232 | A1 | 3/2011 | Ruwisch | |
| 2011/0117850 | A1* | 5/2011 | Fung | G08C 17/02 455/41.3 |
| 2012/0278041 | A1* | 11/2012 | Haulick | H04M 1/24 702/182 |
| 2012/0329445 | A1* | 12/2012 | Elliott | H04W 4/008 455/420 |
| 2013/0012179 | A1* | 1/2013 | Watkins | H04L 67/34 455/418 |
| 2014/0136148 | A1* | 5/2014 | Pai | G06F 11/2294 702/186 |
| 2014/0278439 | A1* | 9/2014 | Rajagopal | G10L 15/01 704/275 |

* cited by examiner

SYSTEM FOR TESTING WIRELESS INTERACTION BETWEEN A SYSTEM FOR REPRODUCING AUDIO SIGNALS AND A MOBILE PHONE, AND CORRESPONDING METHOD AND COMPUTER PROGRAM PRODUCT

FIELD OF THE INVENTION

The present invention relates to a system for testing wireless interaction between a system for reproduction of audio signals, in particular a user-interface device of a motor vehicle configured for reproducing audio signals, and a mobile phone, the aforesaid reproduction system and mobile phone being configured for communicating over a wireless communication channel for short-range communications.

As is known, in the automotive field, there have recently entered into use systems designed to enable the driver and passengers to interact with the motor vehicle. This interaction may envisage interacting with functions of the vehicle such as the heating or air-conditioning system, or else the on-board stereo system. This interaction may, instead, envisage controlling management of a mobile-telephone terminal, for example in the so-called "hands-free" mode. Other functions may refer to the interaction with satellite-navigation systems or to use of information coming from a control unit or on-board computer.

For the above purpose, motor vehicles are equipped with a human-machine interface, which makes it possible to interact with the on-board systems by entering data, for example a telephone number or a destination in the satellite navigator.

An example of the above interface is represented by the system Blue & Me™, which makes available commands on the steering wheel and a universal voice-recognition system, which does not require learning and recognizes any type of voice. This system, in particular, provides a hands-free kit through a wireless channel of a Bluetooth™ type, which is set up, through a pairing procedure, with a mobile-telephone terminal of the driver or of a passenger. The above Blue & Me™ system enables, on the other hand, use of other personal devices such as music players, in a safe way without having to resort to commands for these devices.

It is clear that for a system of this sort the quality of the audio signal is very important, and consequently, in particular during development and integration in motor vehicles of this kind of systems it is necessary to verify the aforesaid quality, i.e., to carry out tests on the systems in order to measure the quality thereof.

However, up to the present day, to verify operation of the above systems tests are used that envisage simply setting up test communications using a mobile terminal coupled to the interface system via the short-range wireless channel and making for example a call to a second mobile-telephone terminal on the mobile-phone network, for example, 3G or GSM.

This procedure is on the other hand far from flexible and is expensive in so far as it requires availability of a number of mobile terminals and moreover requires calls to be made, with the consequent expenditure.

OBJECT OF THE INVENTION

The object of the present invention is to provide an improved system that will enable testing of the interaction between an apparatus for reproduction of audio signals, in particular a user-interface device of a motor vehicle configured for reproducing audio signals, and a mobile terminal through a short-range wireless channel, in a way that is inexpensive and flexible. The present invention is also aimed at a corresponding computer program product.

According to the present invention, the above object is achieved thanks to a system having the characteristics recalled specifically in the ensuing claims.

The invention moreover relates to a corresponding method, as well as to a computer program product, that can be loaded into the memory of at least one computer and comprises portions of software code that are able to execute the steps of the method when the product is run on at least one computer.

As used herein, reference to such a computer program product is understood as being equivalent to reference to a computer-readable means containing instructions for control of the processing system in order to co-ordinate implementation of the method according to the invention. Reference to "at least one computer" is evidently intended to highlight the possibility of the present invention being implemented in a modular and/or distributed form.

BRIEF DESCRIPTION OF THE FIGURES

The invention will now be described with reference to the annexed drawings, which are provided purely by way of non-limiting example and in which.

DETAILED DESCRIPTION OF THE INVENTION

In brief, the solution according to the invention regards a system for testing interaction of a mobile phone, provided with a wireless communication channel for short-range communications, with a system for reproduction of audio signals, in particular a user-interface device of a motor vehicle configured for reproducing audio signals, which comprises a transceiver module configured for communicating via the aforesaid wireless communication channel, for example Bluetooth™, with the system for reproduction of audio signals, the wireless transceiver module being associated to a simulation module that comprises processing means configured for simulating operation of a mobile phone, in particular as regards handling of telephone communications at input to and output from the mobile phone.

Figure 1:
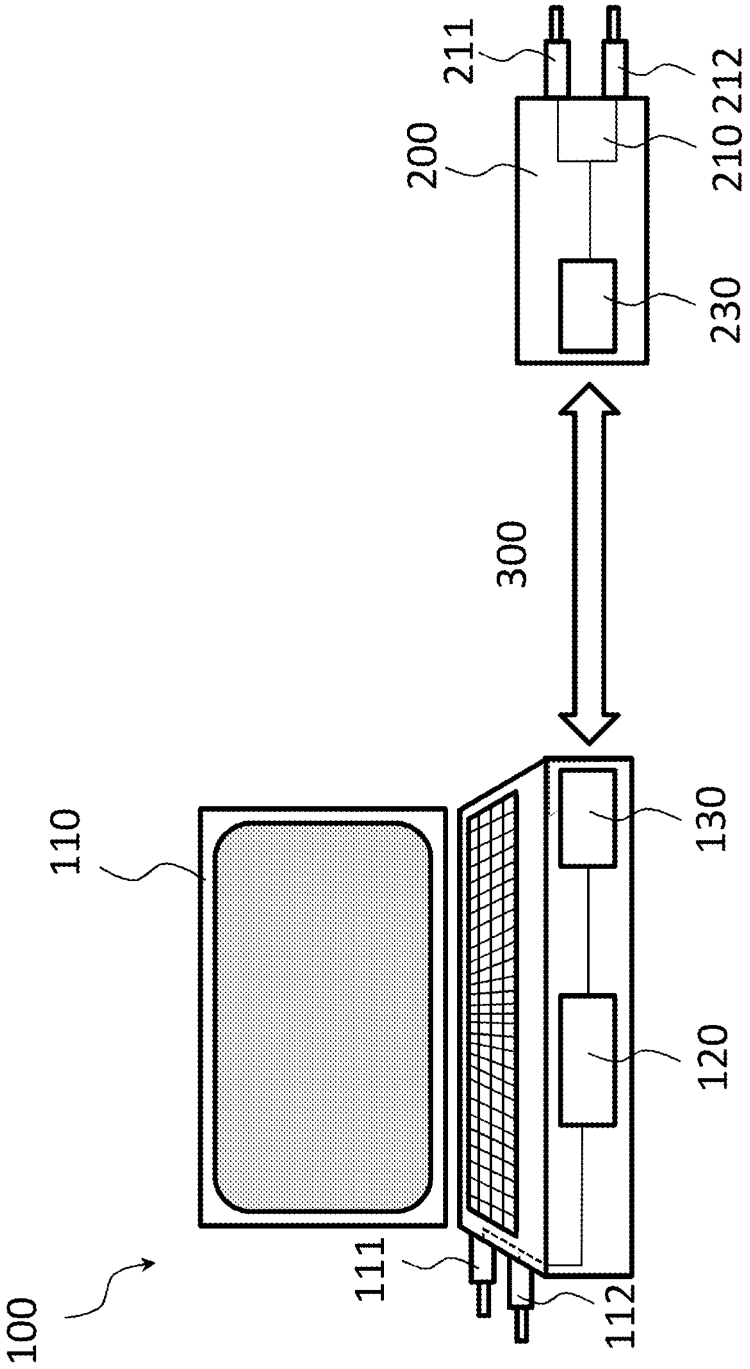
FIG. 1 is a schematic diagram of the system according to the invention.

FIG. 1 shows a system for testing interaction of a mobile phone, provided with a wireless communication channel for short-range communications, with a system for reproduction of audio signals according to the invention. The reference 100 hence designates a module for simulation of a mobile phone. The module for simulation of a mobile phone 100 comprises a computer, in particular a portable computer, 110, which in turn comprises a short-range wireless transceiver 130 designed to set up a short-range wireless communication channel 300, in the example a Bluetooth™ communication channel.

Figure 2:
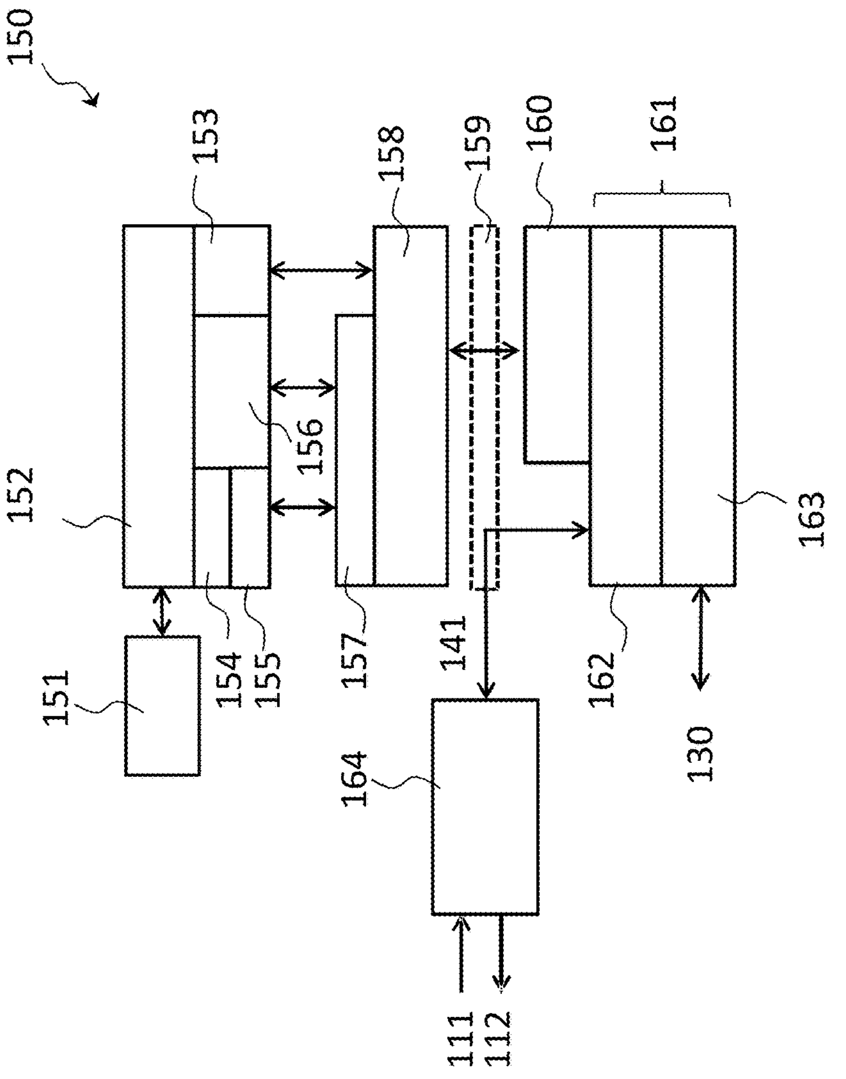
FIG. 2 shows a diagram representing functions of the system according to the invention.

The above portable computer 110 is moreover configured, through software shown in FIG. 1 via a block representing a software module 120, for simulating operation of a mobile phone. By "simulation of operation of a mobile phone" is meant in this case mainly the capacity for simulating the signals regarding a telephone conversation that are normally sent to the loudspeaker of the mobile phone and are received by the mobile phone. In the module for simulation of a mobile phone 100, instead of the microphone and of the loudspeaker of the mobile phone, an audio input and an audio output are respectively provided, i.e., preferably, but not necessarily, physical or hardware signal connectors, to which there can connect up devices, which may also be either hardware or software, respectively, that generate and/or receive audio signals. Provided in this regard in FIG. 2 are details of the protocol adopted by the software module 120. In particular, the software module 120 is configured for communicating in a signal-exchange relationships with the short-range Bluetooth™ transceiver 130; i.e., for example, it exchanges therewith the same signals as those that would be exchanged with the CPU or with the processing and management module of a mobile phone for supporting the hands-free mode during a conversation. Simulation of operation of a mobile phone may also comprise simulating functions of data-transfer capacity.

In the example of FIG. 1, the module for simulation of a mobile phone 100 specifically comprises an audio input 111, i.e., a physical connector corresponding to the audio input of the computer 110, and an audio output 112, corresponding to the physical connector representing the audio output of the computer 110, the signals of which, as will be described in greater detail in FIG. 2, are supplied to the software module 120.

FIG. 1 then shows a user-interface device of a motor vehicle, designated by the reference 200. This user-interface device 200 in turn comprises a respective second short-range wireless transceiver 230 designed to set up the wireless communication channel 300, in particular a Bluetooth™ communication channel.

The above user-interface device 200, which is for example a Blue & Me™ system, is represented schematically through just the respective module 210 for input/output of the signal over the wireless communication channel 300 and through respective audio inputs 211 and audio outputs 212, which are normally connected, respectively, to a microphone 221 and to a loudspeaker 222 of the user-interface device 200.

As illustrated also in what follows with reference to FIGS. 4-7, by way of non-limiting example on the audio input or port 111 of the module for simulation of a mobile phone 100 one of the following signals may be applied:

- an electrical signal in audio band (for example, of a sinusoidal-tone type, or else a multitone type) generated externally, for example by means of a signal generator;
- an audio signal/voice generated through a microphone; and
- an audio/music source, for example the analog output of an MP3 player.

Once again by way of non-limiting example, the audio output or port 112 may be connected to:

- an audio analyser (designated by the reference 401 in FIGS. 4-7), which, for example, carries out measurement of the performance of the signal for incoming/outgoing telephone calls or of the sound in BT streaming;
- loudspeakers of the user-interface device 200 for subjective evaluation of the audio of incoming telephone calls or of the sound in BT streaming; or
- a headset on the module for simulation of a mobile phone 100 for subjective evaluation of the audio in the telephone calls at output from the user-interface device 200.

Hence, the module for simulation of a mobile phone 100 implements the functions of a mobile phone provided with short-range wireless connection, in particular Bluetooth™, without comprising the telephone module, for example GSM, and the corresponding SIM card. The corresponding telephony functions are simulated.

Consequently, the module for simulation of a mobile phone 100 is configured for carrying out one or more of the following operations:

- seeking a system for reproduction of audio signals, in particular the device 200, to which to connect;
- pairing with the aforesaid system or device 200;
- following upon pairing, simulating the functions of hands-free telephone call;
- following upon pairing, possibly managing the phonebook of the mobile phone and transferring it onto the device 200; and
- following upon pairing, performing audio streaming of audio files (MP3, AAC, WAV, or other formats) to the system or device 200, for example on the basis of modifiable playlists.

The module for simulation of a mobile phone 100, as illustrated, comprises audio interfaces from and to the telephone network, making available the corresponding connectors of the inputs 111 and outputs 112 for input/output of incoming/outgoing conversations or voices on the basis of various measurement configurations or scenarios.

Through the above interfaces, or connectors 111 and 112, it is possible to carry out analyses, in particular in real time, through measuring systems, such as the audio analyser described hereinafter with reference to FIGS. 4 to 7.

The module for simulation of a mobile phone 100 may, instead, make use of a recording or capture of the audio and saving thereof to an internal file for carrying out operations of differed analysis of the audio, through processes of analysis implemented via signal processing that will be described in what follows. As has been mentioned, the audio inputs and outputs may in fact be software or virtual, i.e., inputs and outputs that receive/issue audio digital signals, for example on files, for instance within the computer 110.

FIG. 2 is a schematic illustration of the communication protocol implemented by the software module 120, which simulates the portion of mobile phone between the audio inputs and outputs 111, 112 and the transceiver module 130.

In order to guarantee interoperability towards the devices paired with the simulation module 100, it adopts and integrates in its own software module 120 a communication protocol 150, which is in general of a type based upon the software stack Linux Open Source of Bluetooth™, referred to as BlueZ.

Designated in particular by 164 is a PCM codec. In order to carry a PCM mono audio signal from and to the aforesaid PCM codec, both in incoming/outgoing calls and in possible internal sample loops (saved to audio files) the link 141 of an SCO (Synchronous Connection Oriented) type is used.

The protocol hence envisages a GUI (Graphic User Interface) 151 of a Linux native type.

Designated by 152 is an application layer, which is located at the top in the Bluetooth™ stack and in which applicational environments reside. Below this, there is a layer, substantially corresponding to the OSI presentation layer, comprising protocols, such as:

the SDP (Service Discovery Protocol) 153, which enables the simulation module 100 to identify the services that it could exploit by connecting up to devices that support Bluetooth™;

the OBEX (OBject EXchange) communication protocol 155, which enables exchange of binary data, including the data of digital visiting cards 154 of a Vcard type; and commands 156 coming from the application layer.

Then an RFCOMM emulation protocol 157 enables emulation of serial ports for asynchronous exchange of data through the subsequent L2CAP (Logical Link Control and Adaptation Protocol) 158, which has the function of providing services for sending data to the higher layers.

Below this layer an interface 159 of an HCI (Host Controller Interface) type supplies a uniform interface of commands for access to a Link Manager protocol 160 and to the functions of the radio system. The Link Manager protocol 160 is used for setting, control, and safety of the link. The radio system designated as a whole by 161 comprises a baseband protocol 162 and a radio protocol 163, which have the function of carrying out the procedures regarding the physical connection between the devices. In particular, they form the data packets that will be effectively transmitted by the transceiver module 130, implementing correction of the transmission errors and possible encryption of the data.

The link 141 of an SCO type mentioned previously operates between the baseband protocol 162 and the PCM codec 164.

What has been described with reference to FIG. 2 as regards the structures of the Bluetooth™ stack is in itself known to persons skilled in the sector.

According to the invention, in addition to the communication protocol described with reference to FIG. 2, it is envisaged to add some Bluetooth™ profiles.

Figure 3:
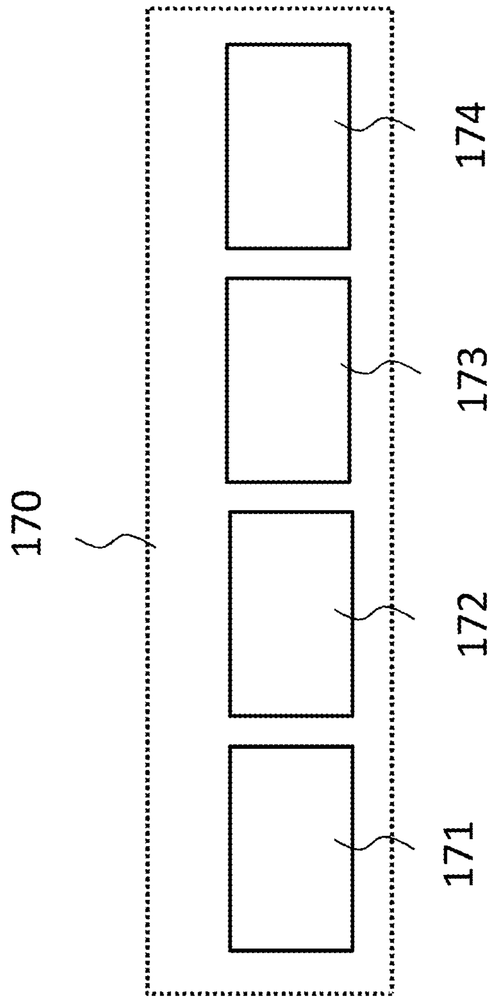
FIG. 3 shows a diagram representing further functions of the system according to the invention.

Represented schematically in FIG. 3 are the profiles implemented 170, which may be viewed as a vertical section of the Bluetooth™ protocol stacks. These profiles define the procedures for ensuring elementary interoperability, basically guaranteeing the capacity of identifying other devices in the vicinity and possibly connecting up to the devices identified, or of being in turn identified and connected.

They enable implementation of the commands and functions of the system according to the invention and the application scenarios. These implemented profiles comprise:

an HFP (Hands-Free Profile) 171, which enables the user to send and receive telephone calls;

a PBAP (Phonebook-Access Profile) 172, which manages the procedures and the protocol for exchanging phonebook objects between the devices, in particular the simulation module 100 and the interface device 200;

an A2DP (Advanced Audio Distribution Profile) 173, which enables wireless transmission of stereo audio signals; and an AVRCP (Audio/Video Remote Control Profile), which is necessary for controlling media playback on the device, in particular the paired and connected device 200.

Also the aforesaid additional profiles 171-174 are Bluetooth™ profiles in themselves known.

In particular, the hands-free protocol 171 integrated in the module for simulation of a mobile phone 100 enables connection and interaction with any hands-free system, such as for example a Bluetooth headset/earset or a hands-free system for motor vehicles, for example a navigator, which supports an HFP-compatible profile, enabling the system under test to behave like a phone and activate all the call functions, the mechanisms for transferring incoming/outgoing audio, and the typical functions of cellphones/smartphones, which, thanks to the simulation module 100, can be accessed without intervening on the simulator itself (for example, via diagnostic commands on the device under test or through its manual-control interface).

As in the case of a real Bluetooth phone, all the functions can be activated from the simulation module 100 itself, without intervening on the hands-free system under test (for example, via menus and commands implemented on the graphic interface of the simulator).

In accordance with the Bluetooth specifications regarding the hands-free protocol, the phone simulator 100, like a real mobile phone, is configured through the hands-free profile 171 for operating as Audio Gateway (AG) and implementing functions of audio input and output.

The device under test, in particular, as described more fully hereinafter in the examples, the user-interface device 200, paired to the Audio Gateway, i.e., to the simulation module 100, has, instead, the role of hands-free (HF) unit and implements remote audio input and output mechanisms.

Emulation of the serial port, provided by the RFCOMM emulation protocol 157 implemented in the Bluetooth stack, is used for carrying from the hands-free unit, i.e., the user-interface device 200, to the Audio Gateway, i.e., to the simulation module 100, the user data, the signals for control of the modem, and the corresponding AT commands (ASCII strings used for communication of the modem and formed by "AT" followed by one or more commands and by a new-line character). The AT commands are analysed by the simulator, and the replies are sent to the hands-free unit via connection to the Bluetooth serial port.

The simulation module 100, in accordance with the HFP 171, is configured for carrying out one or more of the following operations, here the aforesaid operations of HFP simulation, preferably all these operations, managed by the application layer:

handling the connection;

providing information on the state of the phone;

setting the audio connection with the HF unit, releasing the audio connection with the HF unit, and setting the codec;

accepting and answering incoming voice calls;

rejecting an incoming voice call;

terminating a call in progress;

connecting and transferring the audio signal to the HF unit during a call in progress;

making a call on a telephone number supplied by the HF unit or on the last number called; and negotiating the codecs.

As regards the software codecs on the simulation module 100, their negotiation and connection, this simulation module 100, which operates as Audio Gateway, implements a PCM encoding, supports the characteristic of Codec Negotiation and is able to set up the procedure of connection of the codecs when the audio connection is set up by the AG.

When, instead, it is the hands-free unit, in particular the user-interface device 200, that sets up the audio connection, and supports the characteristic of Codec Negotiation, it is the hands-free unit itself that activates the simulation module 100, which is able to set up an audio connection on the channel of the link 141 of an SCO type with the codecs implemented in the simulator 100 itself.

The audio connection between the hands-free unit and the Audio Gateway, i.e., between the device 200 and the simulation module 100, is in any case always associated to an existing Service-Level connection and data-communication links via RFCOMM between the aforesaid devices or modules.

The procedures and commands for connection of the simulator 100 (AG) and the device 200 (HF) may be found in the Bluetooth Hands Free Profile 1.6, May 10, 2011, V16r00, which is available on the website of Bluetooth Special Interest Group, www.bluetooth.org, in particular in Sections 4.11.1, 4.11.2.

Figure 4:
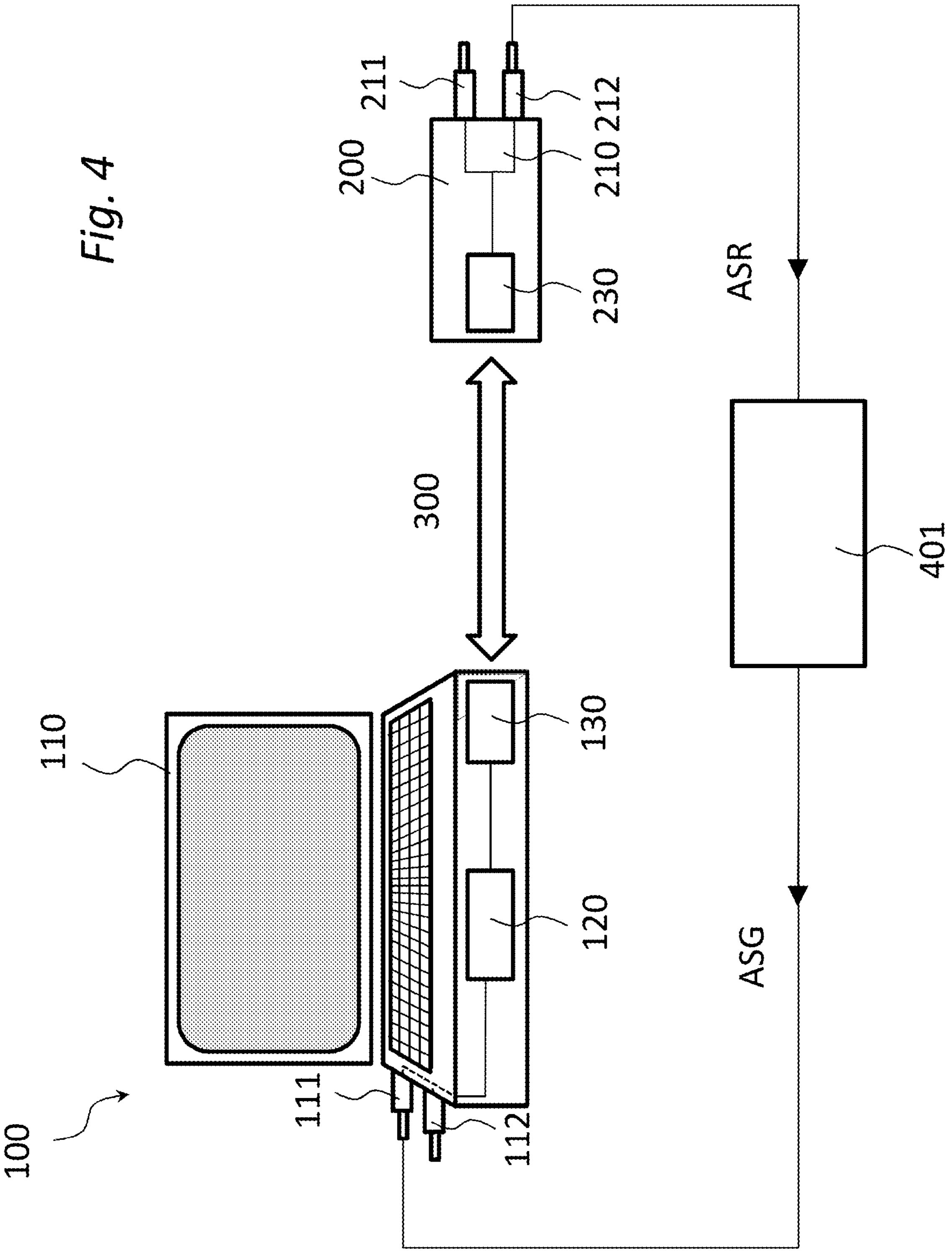
FIGS. 4-7 show different scenarios of use of the system according to the invention.

FIG. 4 shows a first scenario of use of the system according to the invention. In addition to the module for simulation of a mobile phone 100 and to the interface device 200, it is envisaged to use a measuring system, which, in the example, corresponds to an audio analyser 401. In the aforesaid first scenario, the audio input 111 of the simulation module 100, in the example a connector for 3-mm jack plugs, receives an analog electrical signal ASG in audio band generated by the audio analyser 401, as has been said, for example, a 1-kHz single-tone signal or a multitone signal. The connection is made via audio cables, preferably unbalanced and shielded. On the basis of the electrical signal ASG received, the module for simulation of a mobile phone 100 simulates a voice or sound at input to a mobile phone, such as a sound signal received through the antenna of the mobile phone, and sends it, through the wireless transceiver 130 of a Bluetooth™ type, to the corresponding transceiver 230 of the user-interface device 200. This user-interface device 200, then, through its own audio output 212, sends, for example through a corresponding electrical signal received ASR, analog audio to the audio analyser 401, which can hence, on the basis of comparison of the signal generated ASG with the signal received ASR, carry out measurements such as, for example, measurements of signal level, signal-to-noise ratio, distortion, or frequency response and coherence. Given that the audio electrical signal generated ASG can assume various forms, as has been said, such as single-tone, multitone, or even voice signal, it is clear that many different types of measurement can be made. These measurements enable characterization and diagnosis of operation of the device under test, i.e., the interface device 200, in particular with reference to an incoming voice or audio signal received by the interface device 200.

Figure 5:
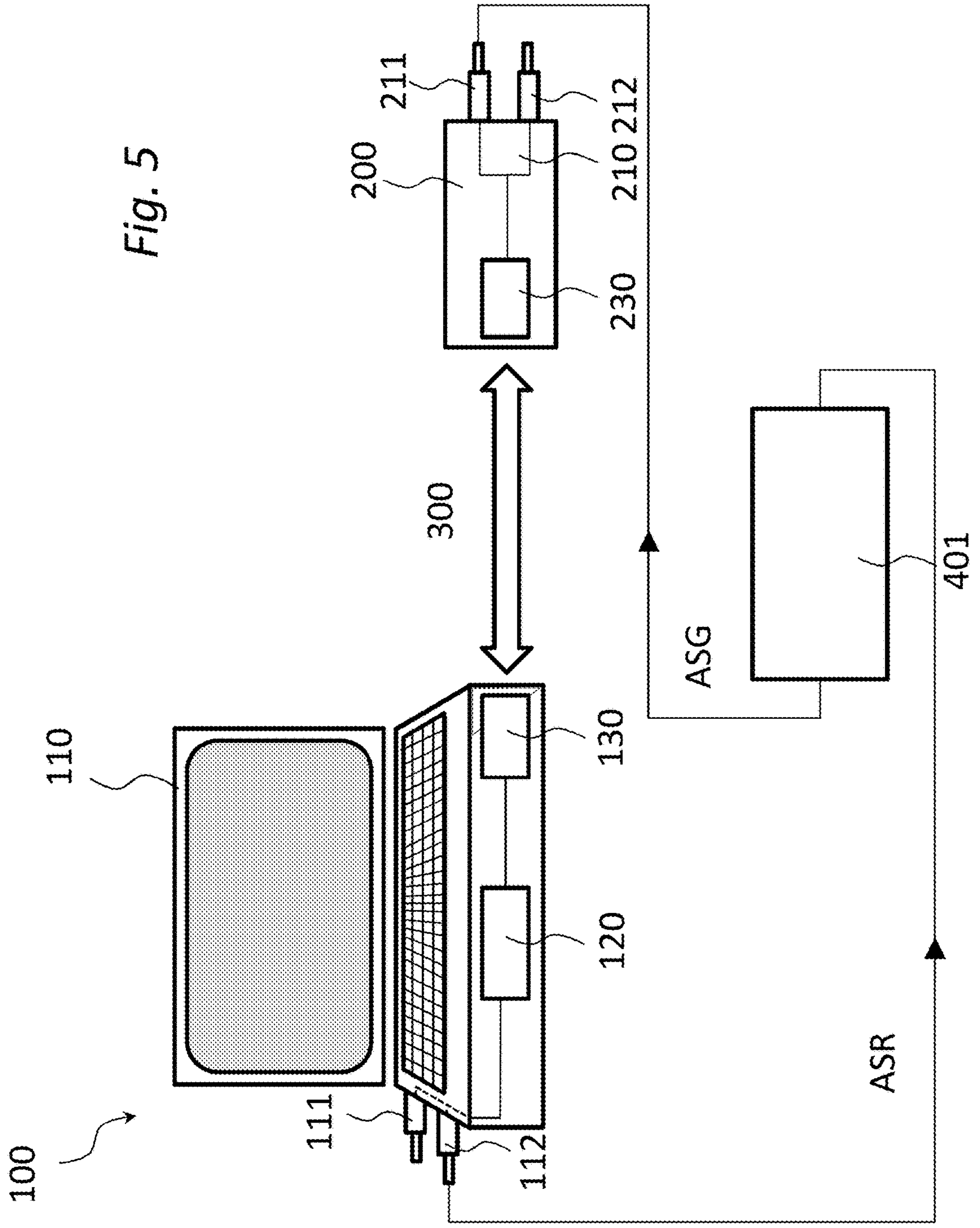

Illustrated in FIG. 5 is a second scenario, in which, instead, the audio electrical signal generated ASG, supplied by the audio analyser 401, is sent to the audio input 211 of the interface device 200, while the audio electrical signal received ASR is received by the audio output 112 of the simulation module 100. The audio electrical signal generated ASG can assume forms corresponding to those already described previously, in particular with reference to FIG. 4, and likewise corresponding measurements can be made at the audio analyser 401. These measurements enable characterization and diagnosis of operation of the device under test, i.e., the interface device 200, in particular with reference to an outgoing voice or audio signal at output from the aforesaid interface device 200.

Figure 6:
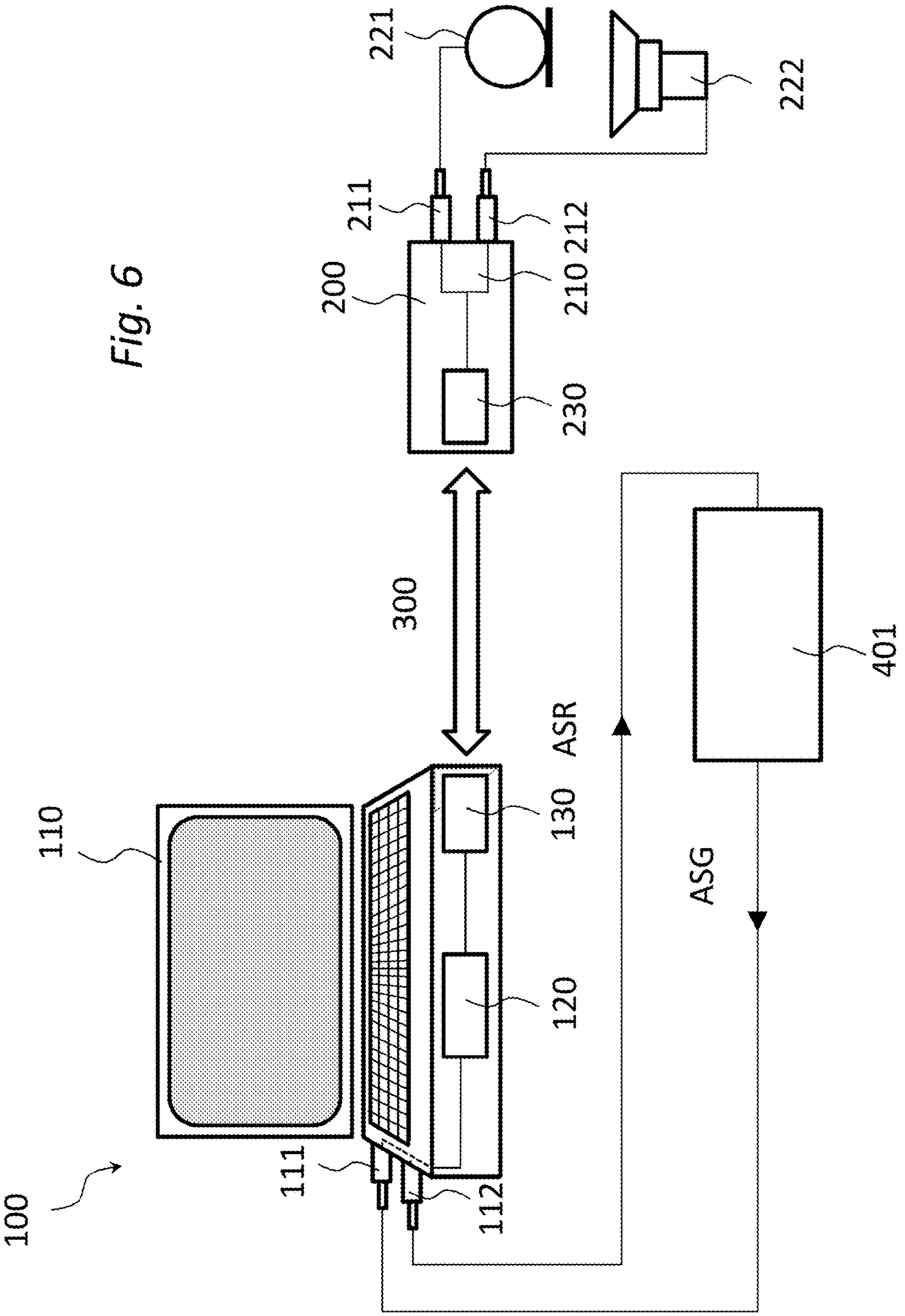

Presented in FIG. 6 is a third scenario, in which, instead, the audio electrical signal generated ASG, supplied by the audio analyser 401, is sent to the audio input 111 of the simulation module 100, while the audio electrical signal received ASR is received by the audio output 112 of the simulation module 100 itself. The audio input 211 of the interface device 200 is connected to the microphone 221, whereas the respective audio output 212 is connected to the loudspeaker 222. In this way, the audio electrical signal generated ASG, through the simulation module 100, the wireless connection 300, and the device 200, reaches the loudspeaker 222, is appropriately paired and collected by the microphone 221, and is sent back onto the wireless connection 300, converted into an audio electrical signal received ASR by the simulation module 100, and is finally received at the audio analyser 401. The audio electrical signal generated ASG can assume forms corresponding to those already described previously, in particular with reference to FIG. 4, and likewise corresponding measurements can be made at the audio analyser 401. The aforesaid measurements enable characterization and diagnosis of operation of the device under test, i.e., the interface device 200, in particular as regards voice signal at input to and output from the device 200, creating a loop on the aforesaid device.

Figure 7:
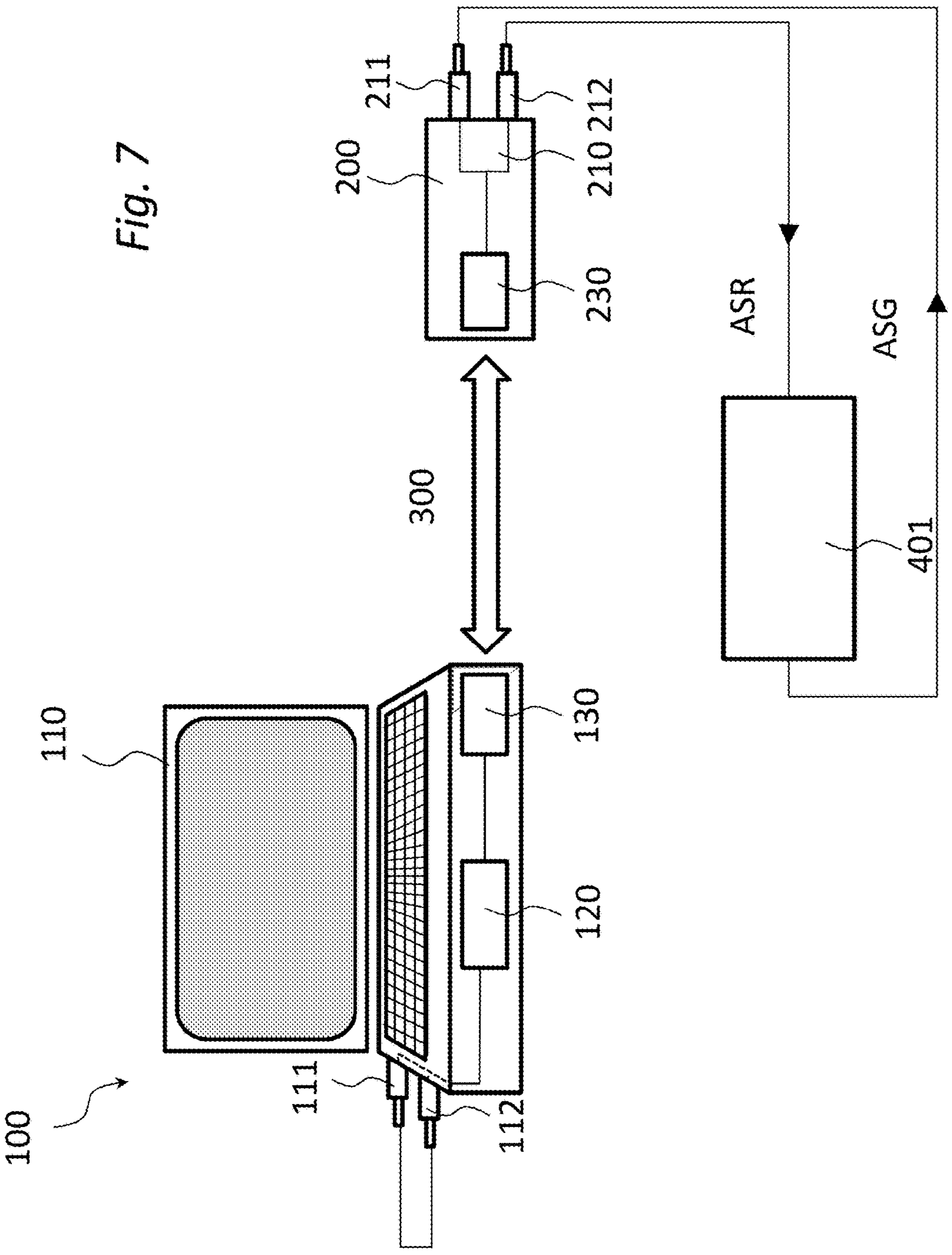

Presented in FIG. 7 is a fourth scenario, in which, instead, the audio electrical signal generated ASG, supplied by the audio analyser 401, is sent to the audio input 211 of the device 200, while the audio electrical signal received ASR is received by the audio output 212 of the device 200 itself. The audio input 111 and the audio output of the simulation module 100 are appropriately connected together, respecting the input and output impedances. This scenario corresponds to that of FIG. 6, but the loop is implemented at the simulation-module 100 end. The scenarios of FIGS. 6 and 7 are useful, in particular, for testing the echo at the respective end.

Via the graphic interface 151 the user can set the simulation module 100 according to the various scenarios and also vary the parameters thereof.

For instance, the graphic interface 151 may comprise selection means, for example, in a purposely provided screenful, for selecting the Bluetooth™ service to launch via the simulation module 100, selected, for example, from the following:

- search for device;
- pairing with device;
- Bluetooth™ streaming service profile (A2DP);
- management of music playlists;
- hands-free service profile (HFP);
- management of phonebook;
- management of files used for simulation of the voice/audio of the user called (distant voice) and for the "ringtone" signal in the call (ringback tone); and
- audio analysis via signal processing.

The hands-free service profile (HFP) comprises, in addition to a console for answering, making, and closing a call similar to those of the Apple iPhone or Android telephone "apps", the possibility of selecting call-simulation functions from audio file and capture on audio file, call from the input 111 of the simulation module 110 and capture on audio file, call from audio file and audio sent onto the device under test, i.e., the interface device 200.

Hence, the simulation module 100 can carry out input/output audio tests in telephone band (audio generation and analysis), in which the audio is applied and received according to the scenarios of FIGS. 4-7. Multiple configurations can be obtained via the HFP 171. For the separate input and output analysis, the corresponding audio signals can be applied to the user-interface device under test 200 and received by the audio analyser 401 applied on the simulator 100. Instead, the audio is applied to the simulator and received by the audio analyser 401 applied to the device under test 200. The audio signals can also be applied and received by the simulator 100 by means of a loopback, device-under-test end, using an audio coupler on the inputs and outputs of the device under test. The audio source is provided by an external audio generator or as audio file in streaming by the simulator 100; the analysis is provided by an external audio analyser or by the simulator itself. The elements of the device under test that are analysed may comprise one or more of the following: audio input, audio output, audio path on PCB, D/A and A/D converters, codec encoding, codec decoding, digital filtering operations performed via code on FPGA, Bluetooth chipset, and software application. One or more measurements are made, for example, measurements of level, frequency, distortion, signal-to-noise ratio, FFT, and perceptive evaluation of the quality of the audio.

The simulation module 100 may operate in a similar way, analysing the same elements, by means of internal loopback via SCO/Audio, where the audio is applied to and received by the device under test, while the simulator module 200 carries out loopback of the audio at a software level. The audio source is provided by an external audio generator; the analysis is provided by an external audio analyser. The loopback, simulator end, is managed by means of commands for control of the interface 159 of an HCI type.

Hence, on the basis of what has been said, the simulation module 100 is configured for carrying out simulation of an Audio Gateway according to the HFP 171, i.e., the hands-free profile according to the Bluetooth specifications. The simulation module 100 is configured via a Bluetooth stack and an HFP for global emulation of the Audio Gateway represented by a mobile phone.

The simulation module 100 is configured via the HFP 171 for carrying out further functions additional to the simple setting-up of a connection with an HFP device to transfer the audio and analyse it; i.e., it is configured for carrying out one or more of the operations of HFP simulation referred to above.

As regards audio analysis, the system described enables it to be made by means of an external audio analyser or by means of signal/data processing internal to the simulation module 100. The direct availability of the input/output audio interfaces with which the simulation module 100 is provided and the direct management of the telephone calls also enables perceptive measurements (PESQ) to be made according to the ITU-T recommendations, the comparative algorithm of which is applied to the voice/audio at input, i.e., the voice/audio that is being sent out, (reference voice/audio) and to the voice/audio at output, i.e, the voice/audio that has returned after it has traversed the Bluetooth channel and the paths of the hands-free device (degraded voice/audio).

Handling of the audio and closing of the audio loop within the simulator is performed directly using the SCO channel and the HCI layer present in the Bluetooth stack of the simulator 100.

The Bluetooth™ streaming service profile (A2DP), when it is launched, may envisage a corresponding screenful with commands for audio playing and selection of pieces that are typical of an audio player, such as Play, Stop, Pause, Next, Previous, Jump to, Repeat One, Repeat All, that are useful for playing a piece of music, for example in MP3 format, streaming of which is performed over the wireless connection 300.

Management of a playlist comprises commands for viewing and updating lists of pieces of music, adding playlists to a Bluetooth™ streaming profile, removing pieces from the playlist, and erasing the playlist.

Since the playlist is logically connected (via logic links) to the database for management of the media player through the effective path of the files in which the pieces of music are saved, the latter preferably reside in the simulation module 100, i.e., in the computer 110. However, they may also be located on a USB pen or external hard disks connected to the simulation module 100 via USB interface, the path of the files of which can be logically linked to the database of the media player.

Hence, in this case, with stereo audio streaming in the 20-Hz to 20-kHz band, as audio source (MP3 files) audio streams are used internal to the simulator 100, which can be loaded through the USB port of the computer and managed by means of playlists. Signal analysis is provided by an external audio analyser, for example the audio analyser 401, connected to the device under test, for example, the device 200. The elements of the device under test analysed are the audio DSP, the HiFi stereo amplifier, the Bluetooth chipset, and the software application. Measurements of level, frequency, distortion, signal-to-noise ratio, and FFT are made.

The graphic interface moreover envisages functions of selection of an audio signal, alternative to the audio electrical signal generated ASG, which resides, instead, in a file on the simulation module 100. In addition to the signals already mentioned, i.e., sinusoidal signals at various frequencies, there may also be sent frequency-sweep signals (with linear or logarithmic frequency sweep), silence intervals, samples of a voice type, DTMF (Dual Tone Multi-Frequency) signals, and in general, of course, any other type of signal that can be entered into an audio file of a PCM type (.wav, .raw) or be generated in runtime by the application of the graphic interface 151.

Management of the telephone book enables, in addition to viewing and updating the contacts of the book itself, adding/linking new Vcard-file contacts to an XML file used as container for the information on the transfer of telephone-book data to the device 200.

The function of management of the files used for simulation of the voice/audio of the user called (distant voice) enables selection of the type of audio to use in the outgoing call and of the ringtone signal to be simulated from among the standard ones of the various countries, such as countries of Europe, the United States, and the United Kingdom.

The function of audio analysis via integrated signal processing envisages the possibility of carrying out audio analysis by processing, within the simulation module 100, the audio signals coming from the device 200 and stored therein as files, instead of sending them to the audio analyser 401, which is preferably used for real-time analysis. As has been mentioned, in this case basically the above audio signals are supplied to a software or virtual input in the simulation module 100. For this purpose, the graphic interface 151 may also envisage an analysis screenful, which reproduces parameters detected by the analysis, such as frequency, amplitude, signal-to-noise ratio, harmonic distortion, number of channels, sampling frequency, resolution, and type of signal, as well as graphic representations of the signals in the time-frequency domain (FFT).

All the data of the analysis are then saved to a corresponding log file within the simulation module 100 itself.

Hence, the advantages of the solution just described emerge clearly from the foregoing description.

Advantageously, the system according to the invention enables testing of interaction between a system for reproduction of audio signals, in particular a user-interface device of a motor vehicle configured for reproducing audio signals, and a mobile terminal through a short-range wireless channel in an inexpensive and flexible way. In fact, the use of a simulation module that simulates the telephone part of the calls enables saving on the cost of hands-free test call and configuration of the tests in a far more flexible and repeatable way than does the use of a normal mobile phone.

The system according to the invention moreover enables easy interfacing using audio-analysis tools, allowing fast adoption of various measurement scenarios that in turn enable testing of different aspects of the interaction via wireless communication channel between a system for reproducing audio signals and a mobile phone.

The system according to the invention may advantageously be used for development, validation, and analysis of devices provided with a Bluetooth™ short-range communication channel, without being tied down to a particular model of mobile phone and to its particular characteristics.

Advantageously, moreover, uncoupling from the mobile telecommunications network also enables ruling out the effect of possible disturbances introduced by the telephone network itself (for example, errors and echoes in transmission, spurious disconnections of the GSM signal), so that only short-range local wireless communication, in particular Bluetooth™, and the codecs/audio paths will undergo audio analysis.

In addition, the system according to the invention does not envisage the need for connection to the network, in particular GSM, as, instead, does a cellphone, in order to function, and this characteristic renders even more unique the idea of the simulator as testing tool in so far as it is totally uncoupled from what could constitute perturbations, disturbance, echoes, and malfunctioning typical of the real GSM network.

The system according to the invention meets the requirements of design, validation, and analysis of Bluetooth systems in stand-alone mode, regardless of the environment in which they are to be installed, for example hands-free systems for motor vehicles, and without any need for such an environment. In the aforesaid systems, of paramount importance is correct and just-in-time design of the software, for example in terms of applications and codecs, and of the hardware (layout of the PCB, A/D and D/A converters, sample-rate and format conversions from/to PCM performed with DSP, digital filtering provided by means of FPGA, performance of the Bluetooth chipset used), as well as characterization/analysis of the integrated system following upon the development stage (fixing of software bugs and/or problems of hardware components) and troubleshooting in the process of fault analysis on systems that return to the factory (covered by the customer guarantee and typically analysed in stand-alone mode in the laboratory). The direct availability of the electrical audio interfaces (or alternatively, the possibility of using audio-streaming files that have been pre-loaded into the computer and can be synchronized with the measurement itself) and the possibility of setting up both outgoing and incoming audio calls, enable generation of the test voices (and constitute an essential basis of this generation) that are necessary for perceptive measurements in accordance with the international standards currently in force, for example ITU-T/PESQ, where the application of algorithms defined by corresponding recommendations and used in the measurements can be implemented only thanks to the fact that, by means of the simulation module, all the hardware/software elements that constitute the system under test are globally stimulated, whereas these elements could not otherwise be activated other than by means of a real commercial phone, which, however, does not have available the aforesaid electrical interfaces and in any case would be tied down to the particular model/manufacturer and, above all, to the real GSM network used for the telephone calls, intervening in the testing procedure.

The system described herein also implements the profiles A2DP and AVRCP and thus enables data to be sent and commands to be simulated for the purpose of carrying out the same tests also on the stereo player, which, also in this case, involves hardware components (above all, the Audio DSP) and the software.

Of course, without prejudice to the principle of the invention, the details of construction and the embodiments may vary widely with respect to what has been described and illustrated herein purely by way of example, without thereby departing from the scope of the present invention.

The system for reproduction of audio signals to be tested is preferably a user-interface device of a motor vehicle configured for reproducing audio signals in vehicle hands-free systems. The system according to the invention may on the other hand be used for testing other systems that present similar features, for example Bluetooth™ loudspeakers equipped with integrated microphone for hands-free calls and Bluetooth™ headsets with microphone.

As has been said, the system according to the invention is able to test not only interaction regarding audio signals, simulating the corresponding functions of the mobile phone, but also the capacity for transferring data via OBEX protocol, such as the aforementioned phonebook transfer, but, by adding other Bluetooth™ profiles based upon OBEX, such as FTP, MAP, OPP, also functions that enable setting-up of services of an office/e-mail type, and sending of messages and images that are frequently associated to user-interface devices, including those of a motor vehicle.

The system according to the invention may preferably be applied to short-range wireless channels that use the Bluetooth™ standard. On the other hand, it may be used in association with other short-range wireless channels, such as UWB (Ultra-Wide Band), Zigbee, or Wi-Fi.

The module for simulation of a mobile phone 100 may be associated in a signal-exchange relationship to the short-range wireless transceiver module that is comprised in the processing means, for example a portable computer with Bluetooth™ interface, or else may be associated to an external device; for example, a Bluetooth™ pen or dongle is inserted in the portable computer.

What is claimed is:

1. A system for testing wireless interaction between a user-interface device of a motor vehicle configured for reproducing audio signals, and a mobile phone, said user-interface device of a motor vehicle configured for reproducing audio signals and said mobile phone being configured for communicating one with the other over a radio wireless communication channel for short-range communications, said system including:

a module for simulation of a mobile phone, including a computer that acts to simulate the operation of a mobile phone, said module for simulation of a mobile phone being associated in a signal-exchange relationship to a short-range wireless transceiver module configured for communicating via said wireless communication channel with the user-interface device of a motor vehicle acting to reproduce audio signals, said computer further acting to simulate a portion of mobile phone between audio inputs and outputs and a transceiver module, integrating in a software module a communication protocol including a protocol stack of the wireless communication channel, wherein said protocol stack includes a hands-free profile which enables the user to send and receive telephone calls, said protocol stack also including a SCO link connected for carrying audio signal both in incoming/outgoing calls and in internal sample loops to and from a baseband module through a HCI (Host Controller Interface).

2. The system according to claim 1, wherein said simulation module comprises an audio signal output and/or an audio signal input.

3. The system according to claim 1, wherein it comprises a system for audio analysis set connected to said audio signal output and/or audio signal input.

4. The system according to claim 1, wherein said wireless communication channel uses the Bluetooth™ protocol.

5. The system according to claim 1, wherein said protocol stack of the wireless communication channel is the BlueZ stack.

6. The system according to claim 1, wherein said simulation module acts to generate internally audio signals to be supplied to said transceiver module.

7. The system according to claim 1, wherein said system for reproduction of audio signals is a user-interface device of a motor vehicle that reproduces audio signals, which comprises a wireless communication channel that employs the Bluetooth™ protocol.

8. The system according to claim 1, wherein the module for simulation of a mobile phone carries out simulation of an Audio Gateway according to the Bluetooth Hands-Free Profile, in particular the Audio Gateway represented by a mobile phone.

9. A method for testing interaction between a user-interface device of a motor vehicle configured for reproducing audio signals, and a mobile phone, said user-interface device and said mobile phone being configured for communicating one with the other over a radio wireless communication channel for short-range communications, said method including the steps of:

providing a module having a computer that acts to simulate the operation of a mobile phone, said module being associated in a single-exchange relationship to a short range wireless transceiver module that acts to communicate via said wireless communication channel with the user-interface device; and simulating a portion of mobile phone between audio inputs and outputs and a transceiver module, including a communication protocol including a protocol stack of the wireless communication channel, wherein said protocol stack includes a hands-free profile which enables the user to send and receive telephone calls, said simulating the protocol stack also including simulating the operation of a SCO link connected for carrying audio signal both in incoming and outgoing calls and in internal sample loops to and from a baseband module through a HCI (Host Controller Interface).

10. The method according to claim 9, wherein said operation of simulating operation of a mobile phone performed by the computer further includes the steps of simulating operation of a mobile phone with respect to incoming and outgoing telephone communications to and from said mobile phone and supplying the results of the simulation to the transceiver module configured for communicating via said wireless communication channel with the system for reproduction of audio signals.

11. The method according to claim 9, wherein said operation of simulating operation of a mobile phone further includes the steps of simulating functions of data-transfer capacity.

12. The method according to claim 9, further including one of the following steps of:

seeking a system for reproduction of audio signals to which to connect;

carrying out pairing with said system;

simulating the functions of hands-free telephone call;

managing a phonebook and transferring it onto the system; or performing audio streaming of high-fidelity music files.

13. The method according to claim 12, wherein said operation of simulating the functions of hands-free telephone call further includes the steps of carrying out simulation of an Audio Gateway according to the Bluetooth Hands-Free Profile, in particular the Audio Gateway represented by a mobile phone.

14. The method according to claim 12, further including the step of carrying out operations of measurement of the performance of the device, in particular through analysis of the audio signal.

* * * * *